United States Patent
Weinbrenner et al.

(10) Patent No.: US 8,397,788 B2
(45) Date of Patent: Mar. 19, 2013

(54) REAR WINDOW ROLLER BLIND WITH ANGLED SUPPORT RAIL

(75) Inventors: Harry Weinbrenner, Oberboihingen (DE); Olaf Buhl, Albershausen (DE)

(73) Assignee: BOS GmbH & Co. KG, Ostfildern (DE)

( * ) Notice: Subject to any disclaimer, the term of this patent is extended or adjusted under 35 U.S.C. 154(b) by 922 days.

(21) Appl. No.: 12/195,056

(22) Filed: Aug. 20, 2008

(65) Prior Publication Data

US 2009/0050278 A1    Feb. 26, 2009

(30) Foreign Application Priority Data

Aug. 20, 2007  (DE) .................. 10 2007 039 255

(51) Int. Cl.
*B60J 1/20* (2006.01)
*B60J 3/00* (2006.01)
*B60J 11/00* (2006.01)

(52) U.S. Cl. ................... 160/370.22; 296/97.8

(58) Field of Classification Search .......... 160/266, 160/267.1, 270, 323.1, 368.1, 370.22, 23.1, 160/24; 296/97.7, 97.9; 248/266, 268, 269, 248/270, 271
See application file for complete search history.

(56) References Cited

U.S. PATENT DOCUMENTS

| | | | | |
|---|---|---|---|---|
| 4,231,411 A * | 11/1980 | Hehl et al. | ..................... | 160/120 |
| 4,399,855 A * | 8/1983 | Volfson | ..................... | 160/23.1 |
| 4,898,224 A | 2/1990 | Woodworth | | |
| 5,433,499 A * | 7/1995 | Wu | ..................... | 296/95.1 |
| 6,059,007 A * | 5/2000 | Tomita | ..................... | 160/242 |
| 6,427,751 B1 | 8/2002 | Schlecht et al. | | |
| 6,547,307 B2 | 4/2003 | Schlecht et al. | | |
| 6,739,375 B2 | 5/2004 | Schlecht et al. | | |
| 6,817,402 B1 * | 11/2004 | Fraczek et al. | .............. | 160/323.1 |
| 7,137,661 B2 * | 11/2006 | Neuer et al. | .............. | 296/136.01 |
| 7,686,375 B1 * | 3/2010 | Schlotterer et al. | .......... | 296/97.8 |
| 2002/0023727 A1 | 2/2002 | Schlecht et al. | | |
| 2002/0059989 A1 | 5/2002 | Schlecht et al. | | |
| 2002/0060468 A1 | 5/2002 | Schlecht et al. | | |
| 2004/0069424 A1 | 4/2004 | Seel et al. | | |
| 2005/0121152 A1 | 6/2005 | Weinbrenner | | |
| 2005/0183835 A1 * | 8/2005 | Nien | .............. | 160/321 |
| 2005/0257903 A1 | 11/2005 | Schimko et al. | | |

FOREIGN PATENT DOCUMENTS

| | | |
|---|---|---|
| CN | 1619091 A | 5/2005 |
| DE | 10057759 A1 | 6/2002 |
| DE | 10057762 A1 | 6/2002 |
| DE | 10353778 A1 | 6/2005 |
| DE | 102005049989 A1 | 4/2007 |
| EP | 1182067 A2 | 2/2002 |
| EP | 1211110 A1 | 6/2002 |
| EP | 1533157 A2 | 5/2005 |
| EP | 1598517 A1 | 11/2005 |
| EP | 1811121 A2 | 7/2007 |
| FR | 2597919 A1 | 10/1987 |
| WO | WO 02/38404 A1 | 5/2002 |

OTHER PUBLICATIONS

Office Action in corresponding Chinese Patent Application No. 200810130998.1, dated Apr. 15, 2011.

* cited by examiner

*Primary Examiner* — Katherine Mitchell
*Assistant Examiner* — Jeremy Ramsey
(74) *Attorney, Agent, or Firm* — Leydig, Voit & Mayer, Ltd

(57) ABSTRACT

A rear window roller blind is provided that has a winding shaft that is rotatably seated between winding shaft bearing pieces. The two winding shaft bearing pieces are fixed to one another by a connecting strut. The connecting strut consists of an angled profile rail.

17 Claims, 4 Drawing Sheets

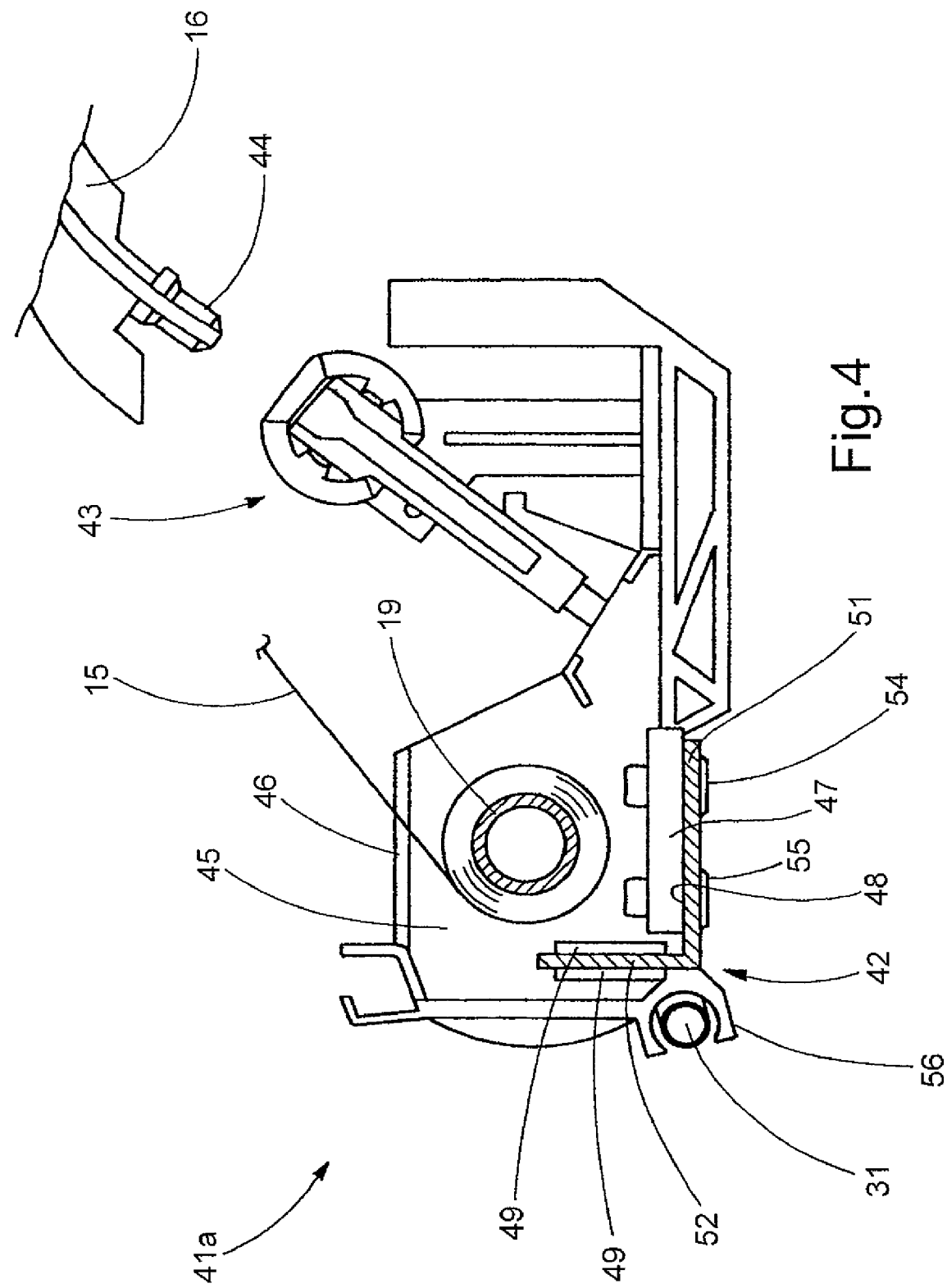

REAR WINDOW ROLLER BLIND WITH ANGLED SUPPORT RAIL

CROSS-REFERENCE TO RELATED APPLICATIONS

This patent application claims the benefit of German Patent Application No. 10 2007 039 255.0, filed Aug. 20, 2007, which is incorporated herein by reference.

FIELD OF THE INVENTION

The present invention relates generally to roller blinds for motor vehicles.

BACKGROUND OF THE INVENTION

Rear window roller blinds for motor vehicles have very successfully established themselves on the market. Currently, they are being used not only in vehicles in the upper price range, but increasingly also in the medium price range. Accordingly, the cost pressures are rising.

Rear window roller blinds generally consist of a winding shaft that is seated underneath the back shelf of the vehicle. A lower edge of a shade is fastened to the winding edge. The opposite edge is connected to a pull rod. The ends of the pull run in guide rails that run parallel to the side edges of the rear window. Depending on the cost of the arrangement, the guide rails are fixed to the rear window or the inside trim of the vehicle or they are integrated into the inside trim. The frame component on which the two bearings supporting the winding shaft bearings are mounted is a considerable cost factor.

OBJECTS AND SUMMARY OF THE INVENTION

In view of the foregoing, an object of the invention is to provide a novel rear window roller blind that has markedly lower manufacturing costs.

The present invention provides a rear window roller blind that has a winding shaft to which one edge of a shade is fixed. The other edge of the shade is connected to a pull rod that runs in guide rails.

In order to support the winding shaft, two winding shaft bearing pieces are provided that are connected to one another via a connecting bar. The connecting bar comprises an angle profile piece that has a constant cross section along its length and includes two flanges or legs.

Although angled rails or angle profile pieces have a very unfavorable torsion behavior and further problems with respect to their bending strength, it has been surprisingly found that, departing from previous conceptions, the strength of such a winding rail is sufficient to retain the winding shaft bearing pieces. The width of the legs or flanges is relatively small for reasons of space, and the material thickness is also small. Surprisingly, the strength is nonetheless sufficient, and there is no need to employ the previously used and comparatively very expensive tubes. Tubes inherently have a substantially greater bending and torsion rigidity, and are therefore intuitively preferred by those skilled in the art. However, the angled profile rail according to the invention is completely satisfactory for the forces that develop in connecting the two winding shaft bearing pieces.

Apart from the significant cost reduction, there is also a savings of space, because the winding shaft can be accommodated in the inside corner of the angled profile rail. The roll body of the shade is thereby partially mechanically protected.

The legs of the angled rail can have differing widths. For instance, the lower leg in the installed position can be wider than the vertically upright leg, so that the lower leg can simultaneously serve as a mounting surface for parts of the drive mechanism.

A very compact construction can be achieved if the gap between one of the two legs and the outer circumferential surface of the roll body that is formed by the wound-up shade is between approximately 5 mm and 20 mm.

An advantageous size and configuration in the installed state and good strength can be provided if the connecting bar is arranged such that one leg is oriented vertically, while the other leg lies horizontally. The connecting bar can be arranged such that the vertically projecting leg is arranged at least approximately diametrically opposed to the point at which the guide rail enters into the winding shaft bearing block. In this way, a shielding effect for the winding shaft can also be provided if no other shield for covering the rear window roller blind is present in the trunk.

The winding shaft bearing piece can have a protrusion with which it is connected to one leg of the connecting bar. The connection between the winding shaft bearing piece and the connecting bar can be implemented by blind rivets. Such a connection is permanent and easily produced. Such a connection is advantageous even when the winding shaft bearing piece is produced as an injection-molded plastic part.

The ease of installation can be further enhanced if the winding shaft bearing piece has a connection mechanism with which the associated guide rail can be positively attached.

The drive mechanism of the rear window roller blind can comprise a spring motor. This spring motor can be coupled to the winding shaft. The spring motor can have any of a number of different configurations such as a helical or spiral spring that is accommodated outside or inside the winding shaft. If the rear window roller blind is electrically operated, a gear motor can also be provided. The gear motor can be mounted on the connecting bar. In order to connect the gear motor to the pull rod, linear connecting elements that are designed to be buckle-free can be provided.

The drawings and description of preferred embodiments below explains the aspects of the invention that are necessary to comprehend the invention. Additional details not described can be inferred by a person skilled in the art in the ordinary manner from the drawings and the description. It is clear that a number of modifications are possible.

The drawings are not necessarily to scale. For example, certain areas may be enlarged to illustrate details. Moreover, the drawings are graphically simplified, and do not contain every detail present in a practical implementation. The terms "upper" and "lower" or "in front of" and "behind," as well as "left" and "right" refer to the normal installation position or to the terminology for motor vehicles.

Other objects and advantages of the invention will become apparent upon reading the following detailed description and upon reference to the drawings, in which:

BRIEF DESCRIPTION OF THE DRAWINGS

FIG. 4 is a side view of one of the winding shaft bearing pieces of the rear window blind of FIG. 1 from the viewpoint of the winding shaft showing the position of the connecting bar.

Figure 1:
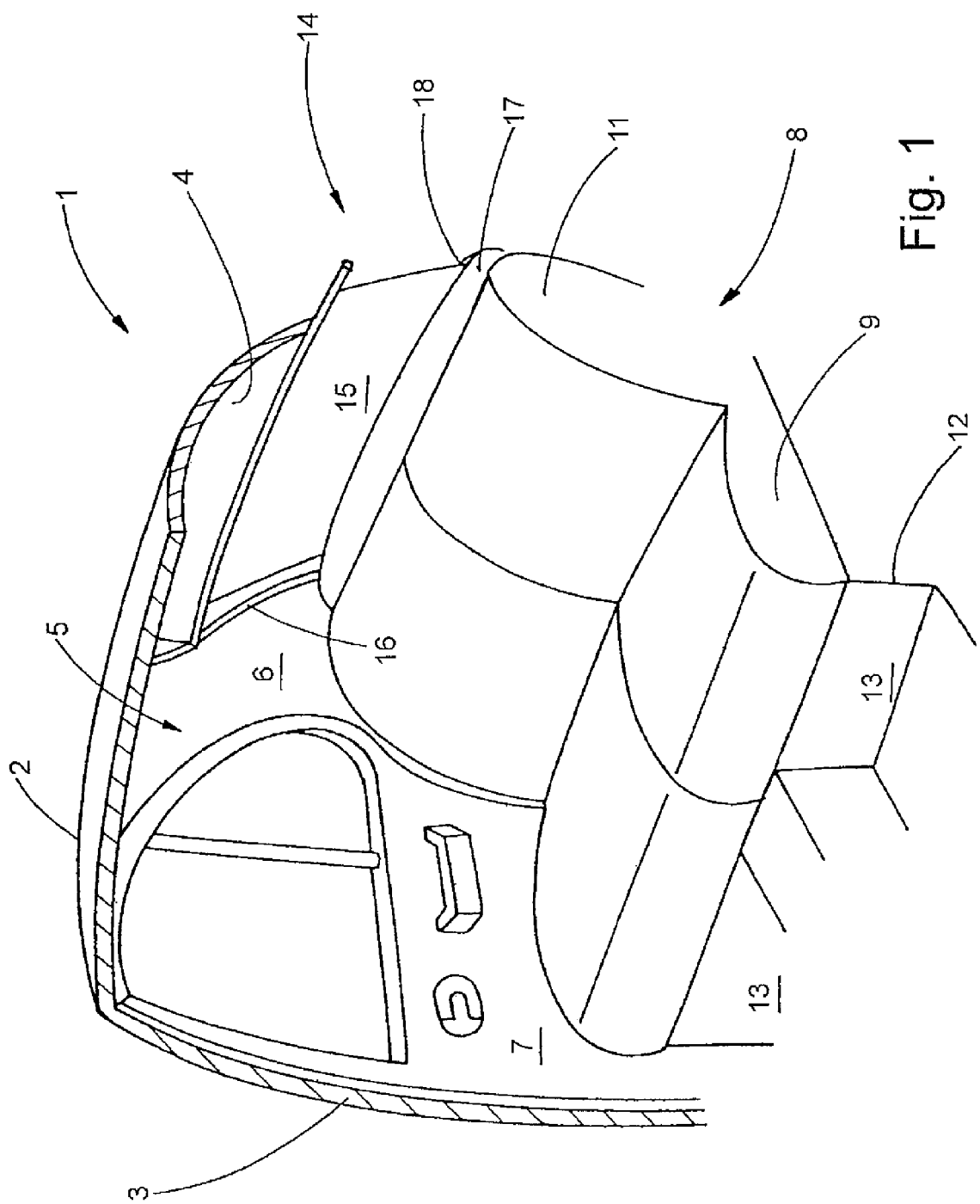
FIG. 1 is a partially cut away perspective view of the rear area of an illustrative motor vehicle equipped with a rear window blind according to the present invention.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

Referring to FIG. 1 of the drawings the rear area of an illustrative passenger car is shown. FIG. 1 provides a view of the right interior side, which is a mirror image of the not shown left interior side. The representation is simplified; for instance, internal body structures such as reinforcements and fastening elements are not shown because they are not necessary for an understanding of the invention.

The illustrated body section 1 has a roof 2 from which a B-column 3 extends down to a floor pan. A corresponding B-column is provided on the broken-away side of the vehicle. The roof 2 transitions at its rear side into a rear window 4. The rear window 4 ends laterally at a C-column 5, which is situated a distance from the B-column 3. The C-column 5 supports an interior trim panel 6.

A right rear door 7 is hinged in the customary manner onto B-column 3 between B-column 3 and C-column 5. A rear bench seat 8 including a seat cushion 9 and a seat back 11 is situated at the level of the right rear door 7. The rear seat cushion 9 rests on a base surface 12 of the floor pan in which foot spaces 13 are formed in front of the rear seat cushion 9.

A rear window roller blind 14 is situated in the vehicle interior in front of rear window 4. A partially deployed shade 15 as well as one lateral guide rail 16 of this rear window roller blind 14 are visible in FIG. 1. The guide rail 16 begins at a rear shelf 17 situated behind the rear seat back 11 and runs alongside the side edge of the window. The rear shelf 17 further contains a continuous slot 18 out of which the shade 15 runs.

Figure 2:
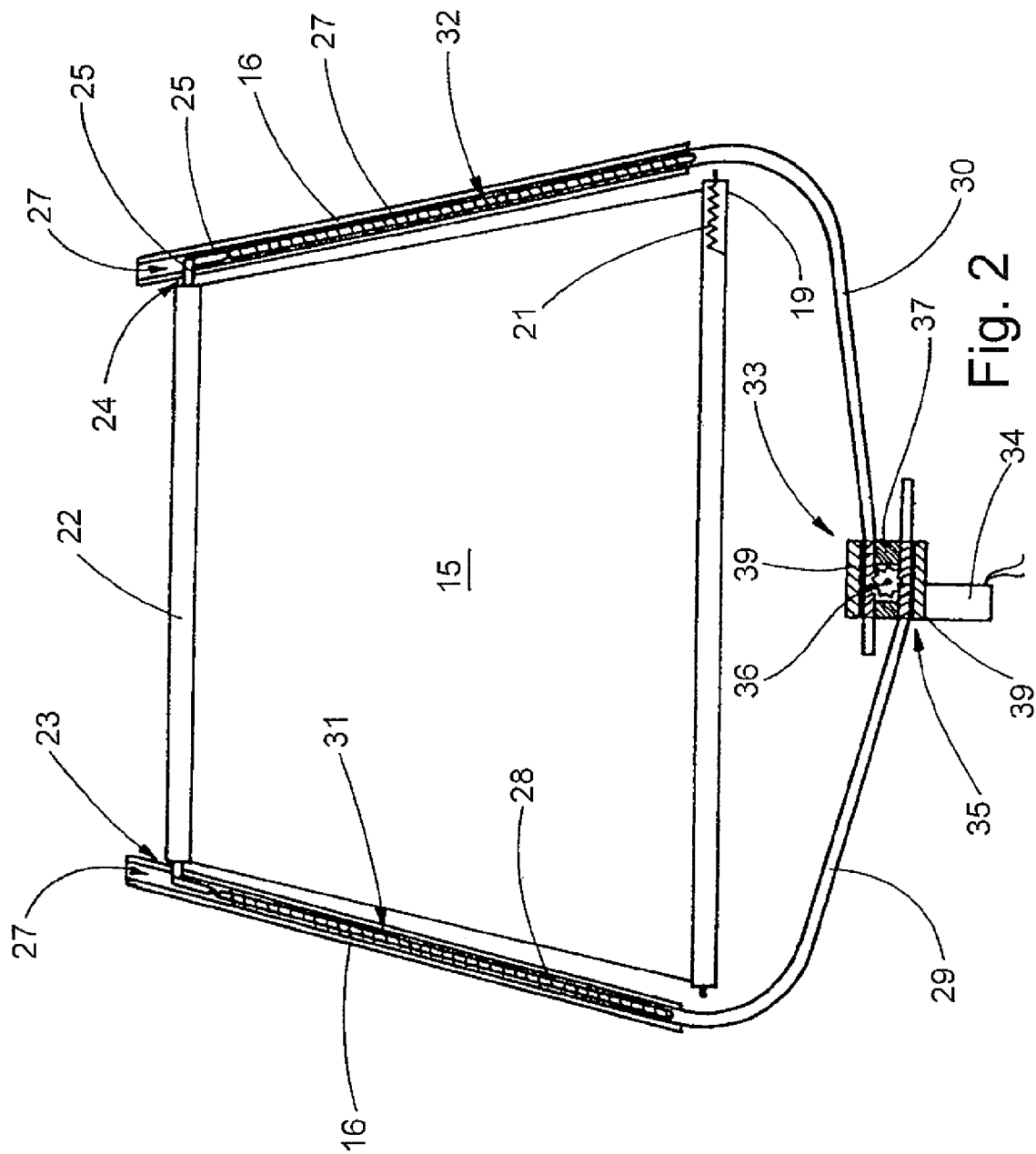
FIG. 2 is a partially cutaway schematic plan view of the rear window roller blind of FIG. 1.

The fundamental structure of rear window roller blind 14 is evident from FIG. 2. A winding shaft 19 to which one end of the shade 15 is fastened is rotatably mounted underneath rear shelf 17. The winding shaft 19 is biased in a direction for rolling up the shade 15 onto the winding shaft 19 with the aid of a schematically shown spring motor 21. For this purpose, a helical spring is provided which is anchored fixedly to the body at one end and is fixed in winding shaft 19 at the other end.

The shade 15 has a roughly trapezoidal shape. The end of the shade 15 remote from winding shaft 19 has a tubular loop 22. A tubular extruded profile piece or bow, on which guide pieces 23 and 24 are telescopingly seated, runs through this loop 22. The guide pieces 23 and 24 include a neck part 25 that is shaped as a short cylindrical section having a smaller diameter than an adjoining guide member 26. The guide pieces 26 run in guide rails 16, which are arranged alongside the two side edges of the rear window 4. Each of the guide rails 16 contains an undercut guide groove 27 that opens out into a guide slot 28 that faces towards the shade 15. The guide piece 26 runs inside the chamber of the guide groove 27.

The lower end of each guide rail 16 is connected to a guide tube 29, 30, in which two flexible pushing elements 31, 32 run that are advanced more or less far into the guide rails 16. The flexible pushing elements 31 and 32 are so-called suflex shafts. They consist of a cylindrical core that is surrounded by a helical rib. With this arrangement, a type of flexible toothed rack with circumferential teeth is obtained.

The guide tubes 29 and 30 connect the guide rails 16 to a gear motor 33. The gear motor 33 consists of a permanently excited DC motor 34 and a gear assembly 35. A spur gear 37 is rotationally fixed on the output shaft 36 of the gear assembly. The spur gear 37 meshes positively with the two pushing elements 31 and 32. The pushing elements 31 and 32 run tangentially past the spur gear 37 on diametrically opposing sides and are guided for that purpose in respective boreholes 38 and 39.

By setting the gear motor 33 in motion, the pushing elements 31, 32 are optionally advanced into or retracted from the guide rails 16. The guide pieces 23 and 24, which are connected to the suflex shafts, follow the movement of the pushing elements 31, 32. These guide pieces are held with the aid of the spring motor 21 against the free ends of the pushing elements 31, 32 that are situated in guide grooves 27.

Figure 3:
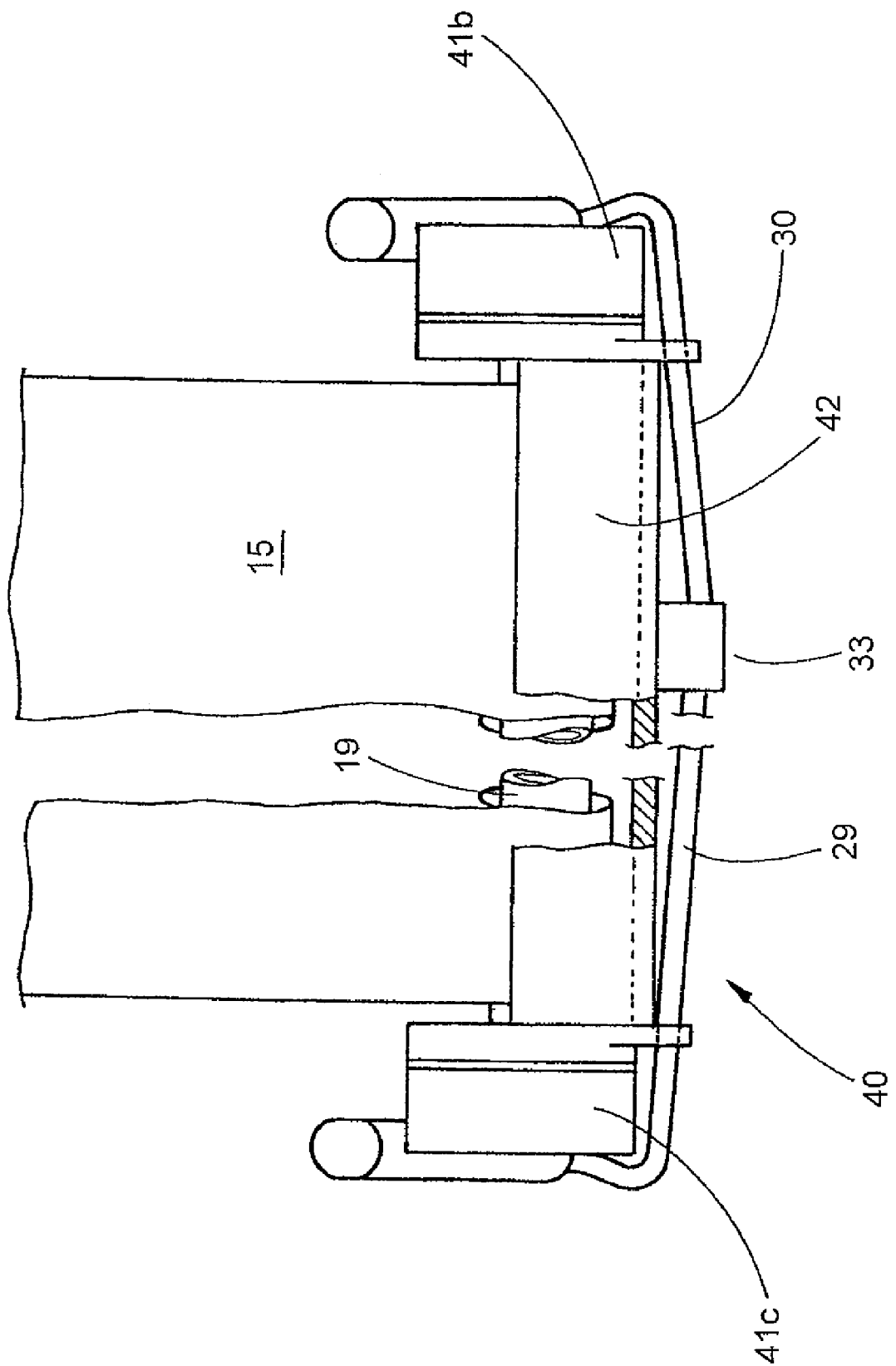
FIG. 3 is a schematic plan view of the connecting bar between the winding shaft bearing pieces and the winding shaft from behind the rear window roller blind of FIG. 1.

In order to hold the structure including the winding shaft 19, guide tubes 29 and 30, and gear motor 35 together even before final assembly in the motor vehicle, a support device 40 is provided as shown in FIG. 3. The support device 40 can include two end pieces 41a and 41b as well as a connecting strut 42 that is fixed to the gear motor 35. The two end pieces 41a and 41b are mirror-symmetrical with respect to one another. Accordingly, only end piece 41a is described in detail below.

The spacing of the end pieces 41a and 41b is selected to match the length of the winding shaft 19. The representation of end piece 41a in FIG. 3 is heavily simplified in the sense that not every reinforcement rib is shown in order to avoid overloading the drawing with details not essential to an understanding of the invention. It goes without saying that small wall thicknesses are selected in order to save material, and these areas are reinforced by appropriate ridges, posts or ribs in a manner known to those in the art. End piece 41a is in one piece, unless otherwise indicated.

FIG. 4 shows an integrally injection-molded winding shaft bearing piece 41a in conjunction with a coupling device 43 into which the lower end of the associated guide rail 16 can be inserted with an insertion pin 44. The winding shaft bearing piece 41a includes a vertical sidewall 45 with a bearing pin, which projects perpendicularly towards the viewer, as a bearing for winding shaft 19.

The sidewall 45 is enclosed above and below by a short flange 46 projecting up from the sidewall 45. At the bottom, the flange 46 forms a projection 47 in the form of a rectangular flat profile that projects in the same direction as the bearing pin for the winding shaft 19. The projecting flange 47 faces toward the opposing end piece 41b and forms a flat lower contact surface 48.

A gap or slot is defined by two brackets 49 that are molded on behind the winding shaft 19. The connecting bar 42 is an angle profile rail consisting of two straight legs or flanges 51, 52 that are at right angles to one another. The end of the connecting bar 42 adjacent to the bearing piece 41a projects with the flange 52 into the slot delimited by the two brackets 49. The other flange 51 bears fully from below against the contact surface 48 of the projecting flange 47. With the flange 51 correctly positioned with respect to projection 47, two hole groups are aligned with one another through which two blind rivets 54, 55 can pass. The heads of the rivets rest against the underside of the flange 51.

The connecting strut 42 is the only part that fastens the two winding shaft bearing pieces 41a and 41b to one another so as to hold winding shaft bearing pieces 41a and 41b together with winding shaft 19 for installation into a motor vehicle. Before installation, the connecting strut 42 also serves as a support for the gear motor 33 and thus as a support for the guide tubes 29, 30 as well as the storage tubes extending them. The gear motor 33 is mounted on the underside of the flange 51.

For the sake of completeness, a fork 56 is molded onto the winding shaft bearing piece 41a next to the outer edge of the connecting bar 42 in order to hold the associated guide tube 29.

In the installed state, the above-described subassembly can additionally be fixed to the underside of the rear shelf and thereby receive further support.

As is evident from the figures, the winding shaft 19 runs in the inside corner of the connecting bar 42 which protects the roll body of the shade from the direction of the trunk and from the bottom.

A rear window roller blind is provided that has a winding shaft that is rotatably mounted between winding shaft bearing pieces. The two winding shaft bearing pieces are fixed to one another by a connecting strut. The connecting strut consists of an angled profile rail.

The invention claimed is:

1. A rear window roller blind for use with a rear window of a motor vehicle comprising:
    a winding shaft;
    two winding shaft bearing pieces configured such that the winding shaft is rotatably mounted between the two winding shaft bearing pieces;
    a connecting bar in the form of an angular rail having an outwardly opening L-shaped cross section defined by two flat flanges arranged at a right angle to one another for securing and supporting the bearing pieces in laterally spaced relation to each other for enabling support of the winding shaft between the bearing pieces;
    a shade having a first edge fixed to the winding shaft, the shade having a shape corresponding to a rear window with which the roller blind is used and a second edge fastened to a movable pull rod;
    two guide rails in which movement of the pull rod is guided, the guide rails being positionable at the sides of a window with which the roller blind is used;
    a drive mechanism for retracting the shade onto the winding shaft; and
    said bearing pieces each having a one-piece construction that includes a mounting portion upon which one flange of the connecting bar is fixedly secured and a slot separate from the mounting portion for receiving the other flange of the connecting bar and securing it against movement relative to the one flange such that the connecting bar fixedly supports and retains the bearing pieces to the connecting bar with the bearing pieces, windup shaft and shade forming a subassembly that is positionable for mounting in a motor vehicle.

2. The rear window roller blind according to claim 1, wherein the two flanges of the connecting bar have differing widths.

3. The rear window roller blind according to claim 1, wherein the two flanges are arranged a distance of between 5 mm and 20 mm from an outside of a roll body defined by the shade when wound-up on the winding shaft.

4. The rear window roller blind according to claim 1, wherein the connecting bar is mountable in a vehicle with one flange of the angular rail extending approximately vertically and the other flange extending approximately horizontally.

5. The rear window roller blind according to claim 4, wherein the vertically extending flange is arranged on a side of winding shaft opposite the guide rails.

6. The rear window roller blind according to claim 1, wherein the mounting portion of each bearing piece is a projection that connects to the one flange of the connecting bar via blind rivets.

7. The rear window roller blind according to claim 1, wherein each winding shaft bearing piece includes a connecting mechanism for positive connection to a respective one of the guide rails.

8. The rear window roller blind according to claim 1, wherein the drive mechanism comprises a spring motor coupled to the winding shaft.

9. The rear window roller blind according to claim 1, wherein the drive mechanism comprises a gear motor and linear drive members that couple the gear motor to the pull rod.

10. The rear window roller blind according to claim 1, wherein the linear drive members have an exterior surface with teeth.

11. The rear window roller blind according to claim 1 in which said bearing pieces each have a one-piece molded construction.

12. The rear window roller blind of claim 11 in which said bearing pieces each have a side wall and a projection from the side wall which forms the mounting portion upon which the one flange of the connecting rail is fixedly secured.

13. The rear window roller blind of claim 12 in which said bearing pieces each have a pair of projections extending from the side wall of the bearing piece that define the slot for receiving the other flange of the connecting bar.

14. The rear window roller blind according to claim 1 in which said bearing pieces each have a one-piece molded construction having a support upon which an end of one of the guide rails is mounted.

15. The rear window roller blind according to claim 1 in which the mounting portion of each bearing piece is a flange that is mounted in overlying relation to said one flange of the connecting bar.

16. The rear window roller blind according to claim 1 in which said guide rails each are connected to a respective of one of said bearing pieces.

17. The rear window roller blind according to claim 1 in which said drive mechanism includes a motor mounted on said connecting bar.

* * * * *